_United States Patent_ [19]

Tehon

[11] Patent Number: 4,650,346

[45] Date of Patent: Mar. 17, 1987

[54] ARRANGEMENT FOR ULTRASONIC TEMPERATURE MEASUREMENT USING A RESONANT SENSOR

[75] Inventor: Stephen W. Tehon, Clay, N.Y.

[73] Assignee: General Electric Company, Syracuse, N.Y.

[21] Appl. No.: 613,318

[22] Filed: May 23, 1984

[51] Int. Cl.[4] .............................................. G01K 11/26
[52] U.S. Cl. ..................................... 374/117; 374/119
[58] Field of Search ....................... 374/117, 118, 119;
310/313 R, 321, 322, 323, 333; 331/155;
D14/57

[56] References Cited

U.S. PATENT DOCUMENTS

| 3,487,690 | 1/1970 | Bell et al. | 374/117 |
| 3,540,265 | 11/1970 | Lynnworth | 374/119 |
| 3,633,423 | 1/1972 | Bell | 374/117 |

OTHER PUBLICATIONS

"Flexible Capillary Ultrasonic Delay Lines", R. L. Rosenberg et al, _Transactions on Sonics and Ultrasonics_, vol. SU-24, No. 1, Jan. 1977, pp. 1–6.
"The Development of the Quartz Resonator as a Digital Temperature Sensor with a Precision of $1 \times 10^{-4}$", A. Benjaminson et al, _Temperature: Its Measurement and Control in Science and Industry_, vol. 4, 1972, pp. 701–708.
"Ultrasonic Thermometry Using Resonance Techniques", J. F. W. Bell, _Temperature: Its Measurement and Control in Science and Industry_, vol. 4, 1972, pp. 709–713.

_Primary Examiner_—Charles Frankfort
_Assistant Examiner_—Patrick R. Scanlon
_Attorney, Agent, or Firm_—Richard V. Lang; Carl W. Baker

[57] ABSTRACT

The invention relates to an arrangement for ultrasonic temperature measurement. The arrangement combines an ultrasonic temperature sensor and an electronic operating circuit. The ultrasonic temperature sensor comprises an acoustic waveguide, a second acoustic wave propagating resonant element, which is exposed to the thermal conditions under measurement, and whose resonant frequency becomes an indication of the temperature, and decoupling means inserted between the waveguide and the resonant element to facilitate high "Q" operation of the sensor. The arrangement utilizes torsional waves if a solid waveguide is employed, or internal surface waves with axial symmetry if a hollow waveguide is employed. The sensor is excited by a pulsed CW source, whose carrier is retuned to the resonant frequency of the sensor, and measured as the indication of temperature. The electronic operating circuitry achieves improved accuracy in temperature measurement as the "Q" of the sensor increases.

7 Claims, 9 Drawing Figures

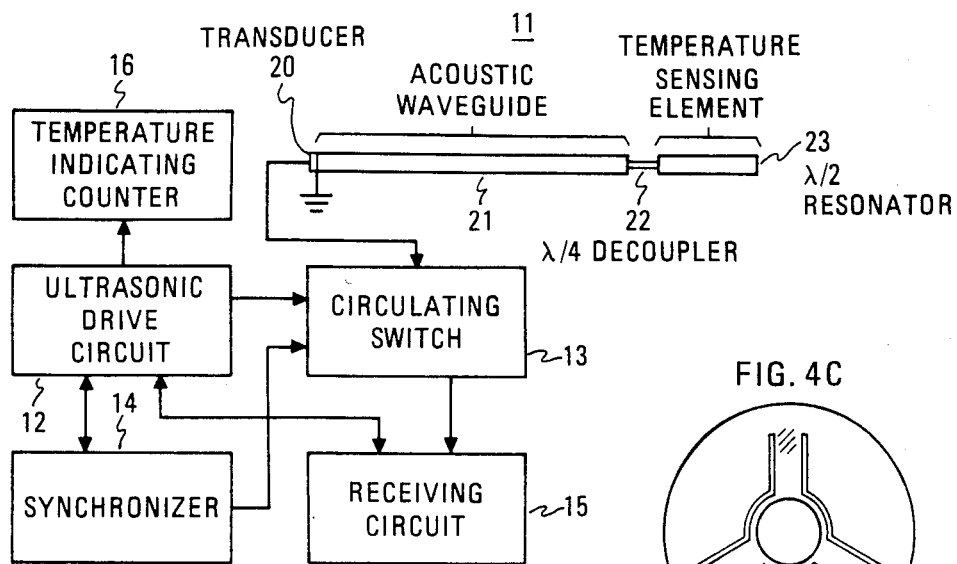
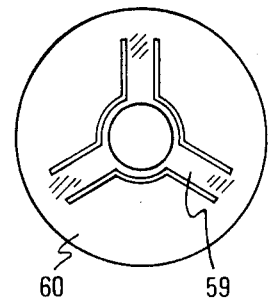
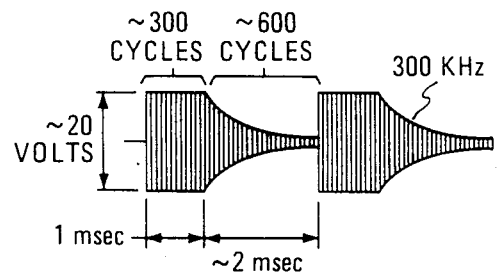
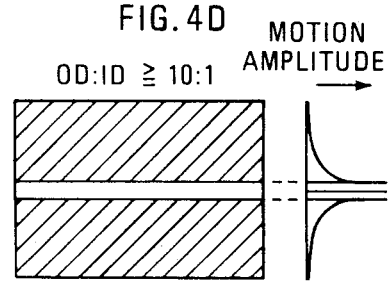
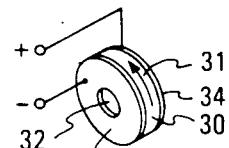
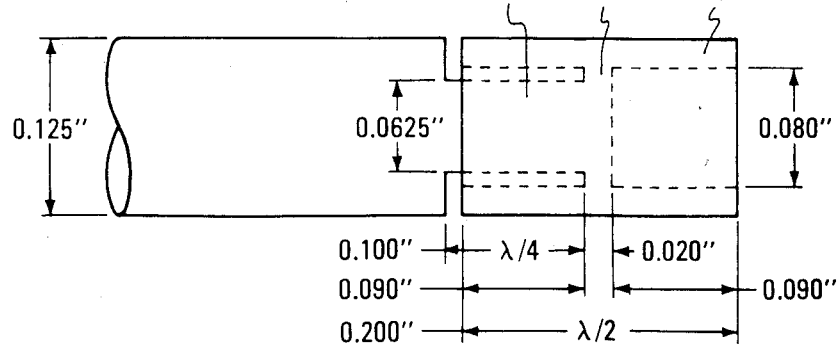

U.S. Patent    Mar. 17, 1987    Sheet 2 of 2    4,650,346
FIG. 3
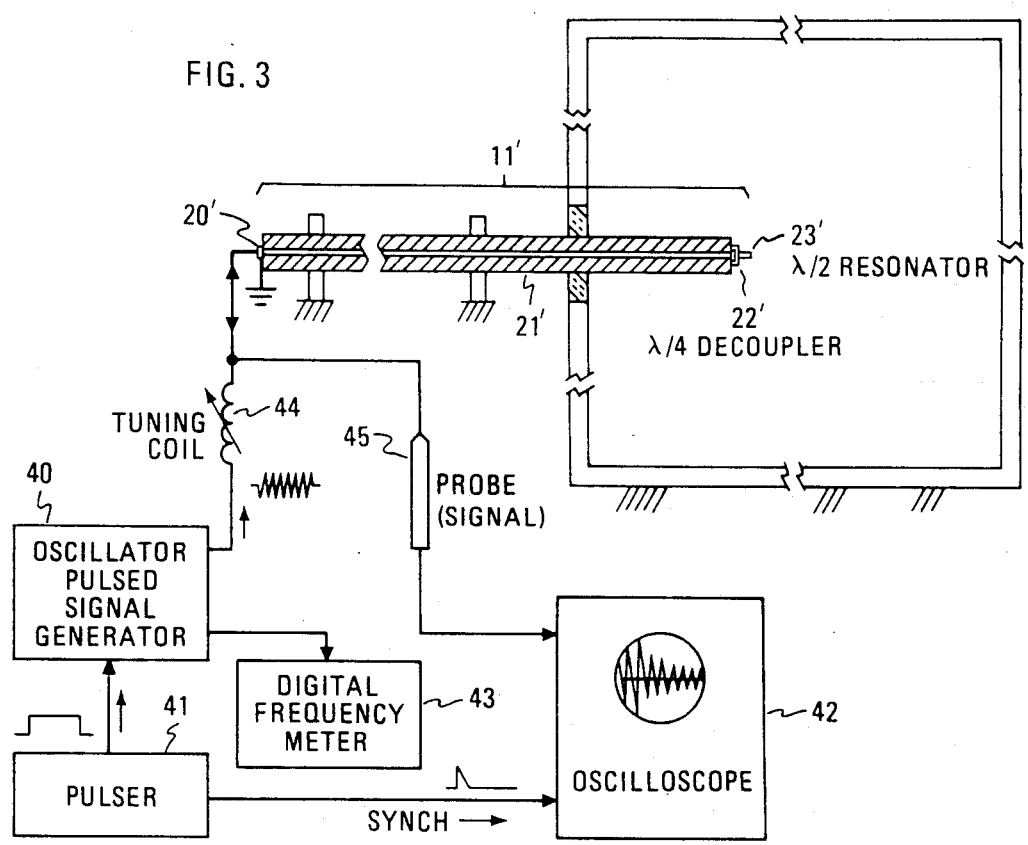
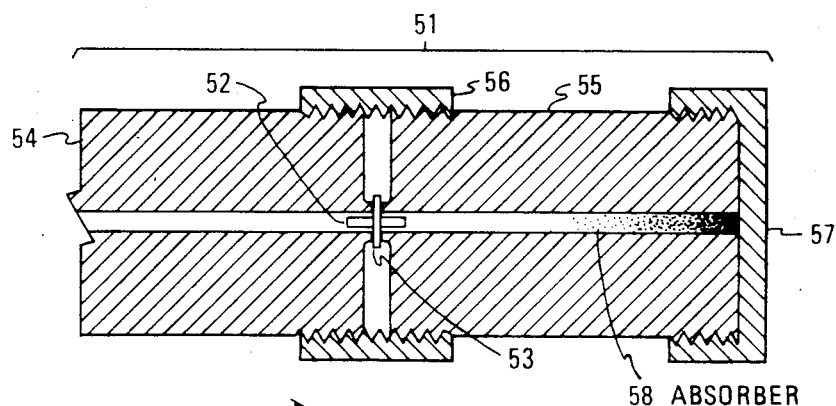
FIG. 4A
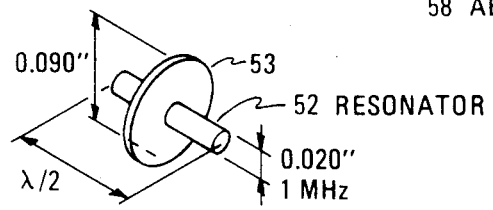
FIG. 4B

ARRANGEMENT FOR ULTRASONIC TEMPERATURE MEASUREMENT USING A RESONANT SENSOR

RELATED APPLICATION

The present application is related to an application of S. W. Tehon entitled "Arrangement for Remote Temperature Measurement" U.S. Ser. No. 613,317 filed concurrently herewith.

BACKGROUND OF THE INVENTION

1. Field of the Invention

The present invention relates to ultrasonic temperature measurement and more particularly to a novel ultrasonic temperature sensor using a high Q mechanical resonator, and to an arrangement for temperature measurement including an operating circuit for the sensor in which accuracy is enhanced by the Q of the resonant sensor.

2. Description of the Prior Art

It is well known that the elastic modulus of a material is temperature dependent, that the temperature may be measured by measuring the velocity of propagation of acoustic waves in the material. The most common method of measurement is to use a transit time or time of flight measurement, in which reflections are produced at two different locations in a sensing element. The time of flight method is simple, but the customary accuracy, assuming a given electronic timing accuracy, is then set by the length of the sensing element between the two locations giving rise to the reflections. If a short sensing region is desired, e.g. ½ to ¼ of an inch, one may expect an accuracy in temperature measurement of about 2 degrees C.

SUMMARY OF THE INVENTION

Accordingly, it is an object of the present invention to provide an improved ultrasonic temperature sensor.

It is another object of the invention to provide an improved remote ultrasonic temperature sensor in which the temperature sensing element may be remotely placed in relation to an electromechanical transducer and electronics.

It is still another object of the invention to provide a remote ultrasonic temperature sensor having an improved coupling element for coupling the temperature sensing element to the electromechanical transducer.

It is an additional object of the present invention to provide an improved ultrasonic temperature sensor, in which the sensing element is resonant.

It is a further object of the present invention to provide an improved resonant temperature sensor of enhanced Q.

It is still another object of the present invention to provide an improved arrangement for temperature measurement including an improved electronic operating circuit for use with a resonant temperature sensor.

These and other objects of the invention are achieved in an ultrasonic temperature measuring arrangement, the combination comprising an ultrasonic temperature sensor and an electronic operating circuit.

The ultrasonic temperature sensor comprises a first acoustic wave propagating element, an electromechanical transducer, a second acoustic wave propagating element, which is resonant, and decoupling means inserted between the two propagating elements.

The first propagating element is of a cylindrical configuration for propagating acoustic waves, preferably with axial symmetry. The electromechanical transducer is mechanically coupled to the first element and has a pair of electrical terminals for launching acoustic waves and for electrically responding to acoustic waves.

The second element, the temperature sensor, is of low loss design, loosely coupled to the first element, and resonant at a frequency which is dependent upon temperature. It is subject to the thermal conditions under measurement. Combined low loss and loose coupling permits significant energy retention by the resonant sensor for a substantial number of waves after the discontinuance of supplied energy. High "Q" operation leads to enhanced accuracy in temperature measurement.

In accordance with another facet of the invention, a torsional mode of vibration is employed, which facilitates loose coupling and high Q operation of the sensor. For convenience in transferring energy to and from the resonator, the first acoustic wave propagation element utilizes interior surface waves, facilitating external support without interference.

In accordance with a further facet of the invention, the electronic operating circuit provides pulsed CW operation of the resonant circuit, the pulse duration being long enough for maximum energy storage in the sensor. Since the energy storage is further maximized when the carrier frequency of the drive circuit is adjusted to equality to the resonant frequency of the temperature sensor, the frequency of the drive circuit required for maximum energy storage in the resonant sensor may be measured to obtain the temperature of the sensor.

Practical experience indicates that other parameters being constant, the higher the attainable "Q", the higher the accuracy of temperature measurement with the practical range of temperature measurement being limited to the linearity of the elastic moduli of the sensor material.

BRIEF DESCRIPTION OF THE DRAWINGS

The novel and distinctive features of the invention are set forth in the claims appended to the present application. The invention itself, however, together with further objects and advantages thereof may best be understood by reference to the following description and accompanying drawings in which:

FIGS. 1A, 1B and 1C are illustrations relating to a first arrangement for ultrasonic temperature measurement, the arrangement utilizing a novel four part resonantly operated remote ultrasonic temperature sensor in accordance with a first embodiment of the invention.

FIG. 1A is a block diagram of the electronic operating circuit for providing pulsed radio frequency signals matched to the resonant frequency of the temperature sensor. FIG. 1A illustrates the four part construction of the sensor including the decoupling means for achieving high Q operation.

FIG. 1B is a waveform illustrating CW operation of the temperature sensor under typical conditions.

FIG. 1C is an illustration of a torsional transducer suitable for operation with the disclosed remote ultrasonic temperature sensors.

FIG. 2 is an illustration of a resonantly operated temperature sensing element in accordance with a second embodiment of the invention, featuring the decoupling means which permit operation with a Q exceeding that of the first embodiment.

FIG. 3 is an illustration of an arrangement for ultrasonic temperature measurement utilizing a second electronic operating circuit, and a novel remote ultrasonic temperature sensor in accordance with a third embodiment of the invention utilizing a conveniently supported hollow waveguide propagating torsional interior surface waves; and FIGS. 4A through 4D deal with a remote ultrasonic temperature sensor in accordance with a further embodiment of the invention, utilizing a conveniently supported hollow waveguide propagating torsional interior surface waves.

DESCRIPTION OF THE PREFERRED EMBODIMENT

An arrangement for ultrasonic temperature measurement is illustrated in FIG. 1A. The arrangement comprises a novel remote ultrasonic temperature sensor 11, operating in conjunction with an electronic operating circuit comprising the functional blocks 12, 13, 14, 15 and 16.

The essential parts of the sensor are shown in FIG. 1A. These include a transducer 20, an acoustic waveguide 21, a decoupler 22, and a resonator 23. The transducer 20, which may take the form shown in FIG. 1C, is a piezoelectric ceramic element, creating ultrasonic vibrations in a torsional mode when excited by alternating voltage from an ultrasonic drive circuit 12, and conversely detecting reflected vibrations, to create an alternating voltage for coupling to a receiving circuit 15. The acoustic waveguide 21 is a solid rod or tube, carrying vibrations in the form of ultrasonic waves between the transducer 20 and a remotely placed resonant temperature sensing element 23. The decoupler 22 provides a short mechanical path, typically of $\frac{1}{4}\lambda$, for linking the waveguide 21 in a loosely coupled relationship to the temperature sensing element 23, typically a $\frac{1}{2}\lambda$ resonator. The decoupler provides a loose linkage that can transmit ultrasonic waves while allowing the resonator 23 and waveguide 21 to vibrate substantially independently of each other. The resonator tends to vibrate freely at a frequency dependent on temperature. Thus, the resonant frequency of the sensor becomes the quantity sensed to obtain the temperature. All of the components of the sensor 11 are selected to be independent of other environmental variables, such as pressure, humidity, electric and magnetic fields, and external vibrations.

The electronic operating circuit determines the resonant frequency of the sensor, and thereby the temperature. The operating circuit comprises an ultrasonic drive circuit 12, a circulating switch 13, a synchronizer 14, a receiving circuit 15 and a temperature indicating frequency counter 16. The ultrasonic drive circuit 12 generates a pulse modulated sinusoidal voltage whose carrier frequency is of several hundred kilohertz, and which can be varied in response to a control voltage. The repetition rate of the modulation pulse may be several hundred hertz with a duration adjusted to suit the circumstances. The receiving circuit 15 may include a monitoring oscilloscope, with amplitude detection means for measuring the voltage of the envelope of the electrical signals sensed at the transducer 20 over a particular time interval after termination of the drive pulse. The voltage of the envelope derived in the receiving circuit 15 may be used in a feedback network to adjust the drive frequency until a maximum envelope measurement is obtained. When the maximum occurs, the drive frequency closely corresponds to the frequency of sensor resonance. The synchronizer 14, containing the system clock, controls the pulse repetition rate of the drive circuit and connects either the driver circuit 12 or the receiving circuit 15 to the transducer 20 at the appropriate times respectively for pulse transmission or detection. A counter 16 continuously monitors the output of the ultrasonic drive circuit for a continuously determined frequency reading, the determination normally being once per second. The temperature indicating counter 16, in an automated system, may also contain a look-up table for converting the resonator frequency to temperature, and may contain internal control logic to indicate the temperature only after the feedback network has stabilized.

In the electronic operating circuit, each drive pulse applied to the transducer must have a duration long enough for waves loosely coupled to the resonator to establish steady resonant vibrations of strong amplitude in the resonator. Typical waveforms (measured at the transducer terminals) are illustrated in FIG. 1B. A short time after termination of the drive pulse, the transducer is switched by the circulating switch 13 from the drive circuit 12 to the receiving circuit 15 for monitoring the amplitude of the waves received at the transducer 20. The duration of the drive pulse is about 1 millisecond, which is adequate to establish strong resonance in the resonator 23, and the time interval between pulses is about 2 milliseconds, which is long enough for the amplitude of vibration to fall to a small fraction (e.g. 10%) of the initial value. The timing of the amplitude measurement is set to begin sufficiently after discontinuance of vibration in the transducer 17, so that only energy stored in the resonator is being sensed. Typically, the amplitude measurement is begun a short period after termination of the pulse (e.g. after 20 waves of the carrier) and averages the amplitude of the waves for a second short period (e.g. for the next twenty waves of the carrier). The switching cycle is repeated several hundred times per second, providing a rapidly sampled observation of the amplitude of ringing oscillations in the resonator during the interval following each excitation pulse. During measurement, the drive circuit frequency is adjusted by the feedback network to the value that produces the strongest response. Measurement with a highly decoupled resonator over a large number of cycles insures that resonance—and temperature—at the resonator, rather than over the entire acoustic waveguide, is observed.

A suitable construction for the sensor 11, in accordance with the first embodiment of the invention, is illustrated in FIGS. 1A and 1C. The acoustic waveguide 21 of a first sensor design is of a solid cylindrical configuration having an outer diameter of 0.251". The $\frac{1}{4}$ wave decoupler 22 has a diameter of 0.125" and a length of 0.200". The resonator has a diameter of 0.251" and a length of 0.400". A radius of 0.0125" is provided in the transition between the smaller diameter of the decoupler 22 and the adjoining orthogonal end surfaces of the acoustic waveguide 21 and the $\frac{1}{2}$ wave resonator 23. The resonant frequency of a resonator of these dimensions at room temperature is approximately 147 kilohertz. A second sensor design, using an acoustic waveguide 21 whose outer diameter is 0.125" and a resonator 23 of equal diameter and 0.200" long, separated with a decoupler 22 having a diameter of 0.0625" and a length of 0.100" exhibited a resonant frequency at room temperature of 313 kilohertz. In both designs, a Hastelloy material is suitable for operation over a temperature range of from 0° to 1000° C.

The transducer 20 of the sensor 11 is shown at the leftmost end of the sensor in FIG. 1A and separately in FIG. 1C. The transducer 20 is a torsional electromechanical transducer mechanically coupled to the leftmost end of the waveguide 21 and includes a pair of electrical terminals, which when suitably energized, generate torsional acoustic waves in the waveguide, progressing to the right end of the member 11 (using the FIG. 1A orientations). When the transducer 20 is in a non-electrically energized mode, suitable for sensing acoustic waves, acoustic waves returning from the right end to the left end of the waveguide 21, are sensed by the transducer 20 and converted into electrical signals which appear at the transducer's electrical terminals.

The construction of the torsional electromechanical transducer employed in FIG. 1A is best illustrated in FIG. 1C. The body of the transducer 30 is a washer-shaped circularly polarized (as illustrated by the arrow 31) piezoelectric ceramic, typically PZT-5 (a lead zirconate titanate) having an outer diameter which is smaller than the OD of the member 21 for optimum acoustic matching. In the event that the transducer has a central opening 32, it may have an inner diameter of 0.010". The thickness of the transducer 20 may be as little as 0.010", but may be thicker depending on the operating frequency. The near and far faces of the transducer are provided with electrodes 33 and 34 which cover these surfaces and which are the points for electrical connection to the transducer. The selection of minimum thickness for the transducer assumes that the resonant frequency is above the operating frequency, which is desirable for broad band operation. The use of minimum thickness also increases the interelectrode capacitance of the transducer and minimizes the capacitive loading effect of external loads. The transducer 20 is rigidly attached to the waveguide 21, usually by means of a solder.

The transducer 20 generates torsional acoustic waves in the structural member 21 in a well known manner. When the electrodes 33 and 34 are coupled to dissimilar electrical potentials, an axial field is generated throughout the body 30 of the transducer. The body however is polarized in a circular manner as indicated by the arrow 31 in FIG. 1C. Thus, the axial electric field interacting with the circular polarization will generate rotational shearing stresses in the piezoelectric body, so that the face in contact with electrode 33 will rotate with respect to the opposite face in contact with electrode 34. The rotational sense of the stresses will reverse if the polarity of the potentials applied to the electrodes is reversed. The ability of the transducer 20 to exert stresses upon the end of the member 21 results from the inertia (e.g. rotational moment) of the transducer per se. The torsional stresses which are generated in the transducer induce corresponding strains and stresses in the member 21. The physical arrangement is designed to transfer these torsional stresses and strains axially through the bulk of the member 21 for propagation in a conventional torsional mode.

Actual examples of the FIG. 1A design have been found to give temperature measurement accuracies of about ±20° Centigrade over the range of from 0° to 1000° C., with the dispersion of individual readings tending to be on the order of ±0.2° Centigrade.

The ultimate accuracy of temperature measurement depends upon being able to design a highly decoupled, high Q resonator, decoupling being benefited by the use of a torsional mode, and by the use of a suitably long, averaged reading to reduce uncertainties in frequency determination, the accuracy being benefited by the use of a repetitively pulsed type of energization.

When pulsed with a signal containing energy at the resonant frequencies, the resonator vibrates with greatest strength at resonance, with vibrations dying out as they are absorbed. The two major sources of absorption are internal friction, and energy leakage from the resonator through the decoupler. Measured in terms of the effective quality factor "Q", the internal friction corresponds to a Q value on the order of 10,000. With a measured Q of several hundred, it is evident that the leakage must be greater than losses due to internal friction, which correspond to 10,000. The effect of internal friction on accuracy may be about 0.02° Centigrade and constitutes an irreducible minimum error in the task of optimizing the sensor design. The rate of energy "leakage" between the resonator and the waveguide is thus the factor having the greatest effect upon the accuracy of the temperature measurement.

To estimate Q of the resonator 23 due to leakage, we can assume that the resonator, with negligibly small internal friction, has end-face mechanical impedance given by:

$$Z = j Z_0 \tan \omega l/c \qquad (1)$$

where $l$ is resonator length, $c$ is the speed of the vibrating waves in the resonator, and $Z_0$ is the mechanical characteristic impedance of the resonator. At any of the harmonic resonances, $\omega = \omega_0$ and the impedance is zero:

$$\tan \frac{\omega_0 l}{c} = 0$$

$$\frac{\omega_0 l}{c} = \pi, 2\pi, \ldots, n\pi, \ldots$$

and at any frequency near resonance, $\tan \omega l/c$ can be expressed by the first term in its series expansion:

$$Z = j Z_0 (\omega - \omega_0) l/c \qquad (2)$$

The corresponding lossless resonator formed by the series-connected inductance L and capacitance C has impedance $$Z = j\left(\omega L - \frac{1}{\omega C}\right) = j\omega_0 L \left(\frac{\omega}{\omega_0} - \frac{\omega_0}{\omega}\right) \qquad (3)$$

which for any frequency near resonance can be expressed as:

$$Z = j 2L (\omega - \omega_0) \qquad (4)$$

Equating (2) and (4)

$$Z_0 l/c = 2L$$

gives the value of L required for equivalance. Since Q for a series circuit is $\omega_0 L/R$, we can estimate Q for the resonator by calculating the mechanical impedance seen looking from the resonator into the decoupler.

The FIG. 1A arrangement illustrates a quarter-wavelength decoupling 22 section with reduced characteristic impedance $z_0$, attached to the waveguide 21 which has impedance $Z_{01}$. As with $\lambda/4$ transmission lines, the section acts as an inverting transformer such that the impedance looking in is $$R + jX = \frac{z_0^2}{Z_{01}} = \left(\frac{z_0}{Z_{01}}\right)^2 Z_{01} \tag{5}$$

When the guide is properly terminated, $Z_{01}$ is the characteristic impedance of the guide—a pure resistance——and $X=0$.

Under these conditions, Q for the resonator is $$Q = \frac{\omega_0 L}{R} = \frac{Z_{01}^2}{z_0} \frac{\omega_0 L}{Z_{01}} \tag{6}$$

$$= \frac{n\pi}{2} \frac{Z_{01}^2}{z_0} \frac{z_0}{z_{01}}$$

In the usual case, $n=1$ and $Z_{01}=Z_0$.

The ratio $(Z_{01}/z_0)$ depends on the ratio of resonator diameter to decoupler diameter. With longitudinal acoustic waves, characteristic impedance is:

$$Z = A\rho c \tag{7}$$

where A = cross-sectional area, $\rho$ is density, and c is the speed of longitudinal waves, all in the waveguide material. With torsional waves $$Z_0 = I\rho c \tag{8}$$

where I = moment of inertia, $\rho$ is density, and c is the speed of torsional waves. A is proportional to (diameter)$^2$, while I is proportional to (diameter)$^4$. Assemblies with a 2:1 diameter ratio have been tested, confirming the following relationship of Q to the mode of vibration:

Longitudinal Mode ($n = 1, Z = Z_{01}$) (9)

$$Q = \frac{\pi}{2} (4)^2 = 8\pi = 25$$

Torsional Mode ($n = 1, Z = Z_{01}$) (10)

$$Q = \frac{\pi}{2} (16)^2 = 128\pi \cong 400$$

Clearly, the torsional mode is superior to the longitudinal mode when it is desired to reduce the coupling loss to improve the Q in temperature measurement.

In metals, the speed of torsional waves is approximately $$l f_0 = c = 3000 \text{ m/s} \cong 120 \times 10^3 \text{ in/s}. \tag{11}$$

The frequency constant for resonance in the fundamental mode is $$c/2 \cong 60 \text{ kHz-inches}. \tag{12}$$

Thus, for an element length $l=0.2$ inch, for example, $$f_0 \cong 60/0.2 = 300 \text{ kHz} \tag{13}$$

This frequency is close to the measured value using a 0.2" Hastelloy X torsional resonator.

The waveforms of FIG. 1B illustrate the waveform whose maximum is sought in tuning the drive circuit to sensor resonance. It is ordinarily assumed that one can adjust the frequency to an amplitude reading within 2% of the maximum. Thus, it follows that $$2Q\left(\frac{\omega - \omega_0}{\omega_0}\right) \cong \pm 0.04 \tag{14}$$

or $$100 \frac{\Delta f}{f_0} = \frac{2}{Q} \tag{15}$$

Exemplary resonators of the FIG. 1A design had values of Q ranging up to approximately 500. Over the temperature range from 0° C. to 1000° C., the resonant frequency was found to vary by about 12%, or $12 \times 10^{-3}$% per degree C. Using this variation, and assumed accuracy in estimating resonant frequency, the values shown in Table 1 have been calculated, predicting the following error in temperature measurement as a function of Q.

| Q | 100 $\Delta f/f_0$ | $\Delta T$ (°C.) |
|---|---|---|
| 10 | .2 | 16.7 |
| 50 | .04 | 3.3 |
| 100 | .02 | 1.7 |
| 500 | .004 | 0.3 |
| 1000 | .002 | 0.17 |
| 5000 | .0004 | .03 |
| 10,000 | .0002 | .017 |

On may conclude that the quality of performance of a temperature sensor improves with increasing values of the resonator Q. Designs that reduce loading on the resonator by the decoupler will increase its Q to a limit set by the internal damping of the resonator material. Decoupling to a substantial degree may be achieved by the use of torsional waves, using a sensing element with $\lambda/4$ decoupling stub of reduced diameter as shown in FIG. 1A. Since any further reduction of the stub diameter would weaken the structure, especially under lateral shock and vibration, any further decoupling may require resort to a different mechanism, such as shown in the FIG. 2 embodiment.

The FIG. 2 embodiment has been found to exhibit a higher Q than the FIG. 1A embodiment. The basis for this improvement may be explained as follows. Where a cylindrical resonator vibrates freely in torsion, its end surfaces rotate through relatively large alternating excursions, and the plane midway between the ends is stationary. The amplitude of rotation "$\theta$" is a sine function of distance away from this nodal plane, and the torque "T" is a cosine function having its maximum value at the central nodal plane. The mechanical impedance at any position x is given by the ratio $$Z = -\frac{T}{\left(\frac{d\theta}{dt}\right)} = \frac{T}{j\omega\theta} = \frac{jT_m}{\theta_m \tan(\pi x/l)} \tag{16}$$

which for small values of $x$ is

-continued $$Z \approx \frac{j T_m l}{\theta_m \pi x} \quad (17)$$

The value of resonator Q determined by decoupler loading, when the decoupler has characteristic mechanical impedance $z_o$ and the rod has the value $Z_{01}$, with value $Z_0$ for the resonator, is $$Q = \frac{n\pi}{2} \frac{Z_{01}^2}{z_0} \frac{Z_0}{Z_{01}} \quad (18)$$

which is proportional to $Z_0$. From (16), since Z for the resonator is proportional to cot $(\pi x/l)$, a large increase in effective resonator impedance can be obtained by attaching the decoupling rod near the center, with a small value of x. This, indicated by equation 18, produces a large increase in resonator Q.

The undercut resonator is shown in FIG. 2 together with the relevant dimensions $$x = \frac{.01}{.2} = .05 \quad (19)$$

$$\frac{1}{\tan(\pi x/l)} = 6.3$$

Since cot $(\pi x/l)$ is large when $x/l \to \frac{1}{2}$, a marked increase in Q can be obtained.

The increase in Q in the FIG. 2 embodiment is based upon placing the web 36 which interconnects the end of the coupler, at the end of the ¼ wave decoupler 37, and then making the point (x) at which the web 36 is joined to the otherwise hollow cylindrical resonator 38 commence at a value x slightly to the left of the center of the resonator. The drive is absorbed by the load presented by the cylinder 38 as one proceeds through the web, and is less effective at the right end. Thus, the drive will be slightly offset from the actual center of the resonator by approximately one half the thickness of the web.

In the FIG. 1 embodiment, the highest "Qs" were about 500. In the FIG. 2 embodiment, experimental Qs of about 2000 were observed (using a metal whose bulk Q was about 5000).

An arrangement for ultrasonic temperature measurement suitable for laboratory use, and using a novel remote ultrasonic temperature sensor 11' using interior surface wave propagation is shown in FIG. 3. The sensor 11' is shown in an application in which it is designed to measure the temperature of an oven in cooperation with a source 40 of pulsed ultrasonic waves, a pulser 41, an oscilloscope 42, a digital frequency meter 43, and a tuning coil 44.

The remote ultrasonic temperature sensor 11' consists of four principal elements. These elements include the resonant temperature sensing element 23', which is introduced within the oven for sensing its temperature, the hollow waveguide 21' for coupling acoustic interior surface waves from a transducer 20' at normal ambient temperatures into the oven. The temperature sensor 11' is completed by the ¼λ decoupler 22', cup shaped member with a cylindrcial wall and a flat base shown loosely coupling the resonant sensing element 23' to the hollow waveguide 21'.

The principal structural member of the sensor 11' is the tubular waveguide 21' having a relatively small central opening, which extends the length of the member and which provides an internal cylindrical surface upon which acoustic interior surface waves may propagate. The inner diameter of the member 21' is made small in relation to the outer diameter so that the wall thickness will be greater than the depth of penetration of the surface waves propagated on the internal surface and thus permit mechanical support of the sensor without adversely affecting the propagation of the surface waves upon the interior.

The transducer 20' of the sensor 11' is shown at the leftmost end of the sensor in FIG. 3. The transducer 20' may be a torsional electromechanical transducer similar to that illustrated in FIG. 1C or a radial shear transducer (which is not illustrated). The transducer 20' is mechanically coupled to the leftmost end of the member 21' and includes a pair of electrical terminals, which when suitably energized, generate torsional acoustic surface waves on the interior surface of the sensor, progressing from the left to the right end of the member 21' in the FIG. 3 illustration. The body of the transducer 20' has an outer diameter which is slightly larger than the central chamber of the member 21'. In the event that the central chamber of the member 21' is 0.025", the outer diameter of the transducer may be 0.040". The transducer is rigidly attached near its perimeter to the left face of the member 21', usually by means of solder. The outer diameter of the transducer 20' should be slightly larger than the inner diameter of the opening to provide an adequate mechanical connection between the perimeter of the transducer and the inner wall of the tube 21'. This will provide coupling of the transducer to the cylindrical interior walls of the member 21' for launching and responding to surface waves upon that interior surface.

The quarter wave decoupling member 22' and the half wave temperature sensing resonator 23' are bonded to the right face of the hollow waveguide 21'. More particularly, the cylindrical wall of the decoupling member 22' has a diameter which embraces the region of the hollow waveguide primarily active in the transmission of the interior torsional surface waves. The length of the cylindrical wall of the decoupler measured parallel to the axis of the hollow waveguide is a quarter wave at the frequency of operation. In order to reduce the coupling at the point of the interconnection between the decoupling member 22' and the hollow waveguide 21', the mating surface of the member 22' is along the edge of the cylinderical wall to restrict contact with the waveguide to the periphery of the decoupler. The resonant member 23' is of greatly reduced diameter in relation to the decoupling member and has a length of a half wavelength at the operating frequency, also measured parallel to the axis of the hollow waveguide 21'.

The arrangement of FIG. 3 functions in much the same manner as the arrangement of FIG. 1A except that it is non-automated. The source of pulsed ultrasonic waves 40, is a conventional variable frequency oscillator capable of operating over the 100 KHz range. The pulser 41 is a General Radio pulser 1217B which provides both a cut-off bias and periodic modulating pulses to the oscillator as well as a synchronizing signal for the oscilloscope sweep circuits. The amplitude, time duration, and pulse width are set to the particular range of temperature measurements desired. The digital frequency meter 43, which is coupled to the source 40, is a device capable of operating in the 100–500 KHz region. A suitable frequency meter is the Phillips PM6612, which is capable of reading the frequency to a 6 digit accuracy. The oscilloscope 42 is a Tektronix 545 operating in the delayed sweep mode. The delay is adjusted to provide a display of the transducer voltage produced by delaying vibrations of the resonator that follow each driving pulse burst supplied by the oscillator. The probe 45 is a Tektronix 10 to 1 attenuating probe with an impedance of 10 megohms shunted by 7 picofarads capacity. The tuning coil 44 is a Miller variable inductance having a value selected to resonate electrically with the combined capacitance of the probe and the transducer. The value of inductance is on the order of 3 millihenries. In a specific measurement made in relation to the FIG. 1B arrangement in which a Q of 500 was obtained, the signal generator produced an output of 5 volts, while the peak-to-peak voltage measured at the probe was in the range of 20–100 volts.

A fourth sensor embodiment is illustrated in FIGS. 4A through 4D. As in the third embodiment, a hollow waveguide (51) is used to interconnect the transducer (not illustrated) under normal ambient conditions with a resonant temperature sensor (52) and a decoupler (53) exposed to the elevated temperatures being measured. The hollow waveguide 51 is formed of four parts; a lefthand part 54, which is substantially all of the waveguide except for a short righthand part 55, typically less than an inch in length, a coupling 56 for engaging 54 and 55, and an end cap 57. The lefthand and righthand parts 54 and 55, respectively, are provided with external threads at their adjacent ends which permit them to be brought into demountable engagement by means of a threaded coupling 56. At the adjacent ends of the elements 54 and 55, two slightly raised central portions are provided typically having a diameter of 2–4 times the inner diameter of the cylindrical interior. The design provides that when the two members are brought directly into engagement, most of the energy traveling down the waveguide on the interior surface of the cylindrical interior will pass with minimum reflection between the elements. The righthand portion of the interior of the waveguide part 55 is provided with an absorber 58 of shallow threads and/or Duxseal (when the temperature will permit), for maximum absorption of the interior surface waves propagating within the waveguide 51 toward the right end. The right outer end of the waveguide part 55 is provided with external threads which permit the cap 57 to be threaded over the end for closing the interior of the waveguide unit.

The resonant temperature sensing element 52, and the decoupling element 53 are installed in the hollow waveguide 51 at the joint between the lefthand and righthand waveguide parts 54 and 55, as seen in FIG. 4A. The element 52, together with the decoupling element 53 are separately illustrated in FIG. 4B. The decoupling element in its simplest form is a plate of minimum thickness (e.g. 0.010") centrally supporting the torsionally resonant element 52. The decoupling element 53 should have a diameter at least equal to that of the adjoining raised surfaces of the waveguide parts 54, 55 to facilitate coupling of the torsional waves through the joint. The decoupling element 53 supports the resonator element 52, at the center of the element measured along the axis. In a torsional mode of vibration, the length of a resonator should be a half wavelength at the resonant frequency. When it is placed within the interior of the hollow waveguide 51, there should be adequate clearance to avoid engagement. Assuming that torsional waves are propagating from left to right on the interior wall of the waveguide element 54, the left surface of the washer-shaped coupling member will first be driven by torsional waves. Assuming that the thickness of the element 53 is 0.010", the initial force exerted on the torsional element 52 will be displaced to the left of its center by 0.005". This allows the coupling element to be loosely coupled to the resonator as a geometric function of the relationship of 0.005" displacement from center to the overall length of the resonator (e.g., 0.120"). Thus, high "Q" resonance due to the loose coupling and high natural Q of the resonator will occur when the incident waves equal the resonant frequency of the resonant element.

If a high actual Q is sought, one method of increasing that Q is by increasing the compliance of the coupling element 53. The actual distribution of wave energy within the hollow waveguide is illustrated in FIG. 4D. As illustrated, the energy is concentrated very significantly at the interior wall of the tube and is greatly attenuated before the outer wall is reached. When the ratio of inner diameter to outer diameter is on the order of 10 to 1, then external supports may be provided without interference with wave propagation along the interior of the waveguide.

When it is desired to couple energy via the joint between the two waveguide elements 54, 55 it is desirable that the inner end surfaces of the two waveguide elements be in as intimate contact as practical. A design which permits some additional increase in compliance and thereby some increase in actual Q of the resonator with a minimum discontinuity in propagation through the joint is illustrated in FIG. 4C. The decoupling element of FIG. 4C is of a somewhat thicker construction (typically 0.20" to 0.40") than the 4B configuration, with radial saw cuts designed to isolate three or four individual, rotationally compliant spoke-like members 59. Between the members 59 are relatively rigid sector shaped members 60, which fill the spaces between the individual spokes and which maintain good contacts between the abutting surfaces of the waveguides 54 and 55 for maintaining good torsional coupling through the joints. The spokes 59 permit less restrained torsional vibration of the resonator 52. They are made somewhat thinner than the surrounding sectors 60 to avoid contact with the end faces of the waveguide elements. In addition, the spokes 39 are spaced from the sectors 60 by narrow gaps adequate to permit adequate lateral vibration without causing physical contact.

In both versions of the FIGS. 4A–4D embodiment, it is assumed that the hollow waveguide has an inner diameter of approximately 0.025" and an OD of 0.250". The resonator 23" may have a length of approximately 0.120" and have a diameter of 0.020" giving a reasonably long aspect for stable torsional vibration. This diameter is selected to be small enough so that it will rotate in a torsional mode free of possible contact with the interior of the hollow waveguide 51. The decoupling means in both the 4B and 4C variations should have an outer diameter which is at least as large as the diameter of the raised surfaces at the ends of the waveguide elements 54, 55 for good torsional wave coupling through the joint.

In the temperature sensor under consideration, Q's between several hundred and two thousand have been obtained. In implementing the frequency match between the drive frequency, and the temperature sensing resonator frequency, the technique disclosed has been to maximize the amplitude of an envelope over a time interval occurring after discontinuance of the pulse.

The attenuation in db per cycle may be stated as follows:

db/cycle = 27.3/Q

The attenuation may also be expressed in relation to a fixed time interval:

db/millisecond = 27.3/Q × f (KHz)

Assuming a Q of 500, it takes 18+ cycles for the signal to be attenuated by one db. Accordingly, the amplitude is sustained over a significant period, quite adequate for an electronic envelope measurement. Thus, a sample of 20 to 30 waves represents a quite reasonable interval for determining the amplitude of oscillations in the resonant sensor.

A measurement set by a fixed time interval is normally simpler than a count of individual waves, and preferable where extreme accuracy is not required.

The time required for the energy supplied to the resonant sensor to stabilize, is increased as the coupling is reduced, and the Q is increased. The rapid rise of the leading edge of the waveforms of FIG. 1B suggests that the build-up of energy in the resonant sensor is relatively rapid, taking up a relatively small portion of the millisecond period allocated for this purpose. However, the point of observation is the terminal of the transducer, which is coupled to the drive circuit, which does not accurately reflect the build-up of energy in the sensor. The build-up of energy in the sensor has a time constant comparable to that observed during decay. In practice, the determination of the proper duration of the drive pulse is achieved by observation of the decay waveform. The duration of the wave pulse is increased until the decay waveform is increased to a maximum. Under typical conditions, the millisecond time duration corresponding to several hundred waves of carrier is adequate to achieve the desired practical energy storage maximum. Under readings of the present accuracy, the phase of the carrier at turn-off, to the extent that it may affect the amount of energy stored in the sensor, is too small for observation, and need not be controlled.

What is claimed is:

1. In an ultrasonic remote temperature measuring arrangement, the combination comprising:
   A. a first acoustic wave propagating element of a cylindrical configuration having a first end, and a second end for propagating torsional acoustic waves;
   B. a torsional electromechanical transducer mechanically coupled to the first end of said first element and having a pair of electrical terminals, said transducer when electrically energized, launching torsional acoustic waves toward said second end and when electrically unenergized, electrically responding to torsiona acoustic waves impinging on said first end;
   C. A second acoustic wave propagating element of low loss, comprising a hollow cylinder, torsionally resonant in a half wavelength torsional mode with a node midway between the ends thereof at a frequency which is dependent upon temperature, and subject to the thermal conditions under meausrement; and
   D. means comprising a cylindrical member for propagating torsional acoustic waves, of lesser diameter that said first element and of lesser diameter than the inner diameter of said second element, an a quarter wavelength in length at said frequency, a first end of said cylindrical member being joined to the second end of said first element, and the second end of said cylindrical member being joined via a thin radially extending web to the interior of said second element for loosely mechanically coupling said first element to said second element, said low loss and said loose coupling permitting significant energy retention by said second element for a substantial number of waves after the discontinuance of supplied energy.

2. The combination set forth in claim 1 wherein said web is positioned near the node of said second element for effecting a loose coupling.

3. The combination set forth in claim 2 having in addition thereto,
   E. variable frequency excitation means coupled to the terminals of said electromechanical transducer to supply continuous waves in pulses of a given duration, said pulse duration being long enough for the energy storage in said resonant element to stabilize, maximum energy storage occurring when the frequency of said continuous waves is adjusted to said resonant frequency;
   F. means coupled to the terminals of said electromechanical transducer for response to a quantity indicative of the energy stored in said second element for adjusting the frequency of said excitation means until energy storage is maximum, and said excitation means is adjusted to said resonant frequency; and
   G. means responsive to the frequency of said excitation means to indicate the temperature.

4. The combination set forth in claim 1 having in addition thereto,
   E. A variable frequency excitation means coupled to the terminals of said electromechanical transducer to supply continuous waves in pulses of a given duration, said pulse duration being long enough for the energy storage in said resonant element to stablilize, maximum energy storage occurring when the frequency of said continuous waves is adjusted to said resonant frequency;
   F. means coupled to the terminals of said electromechanical transducer for response to a quantity indicative of the energy stored in said second element for adjusting the frequency of said excitation means until energy storage is maximum, and said excitation means is adjusted to said resonant frequency; and
   G. means responsive to the frequency of said excitation means to indicate the temperature.

5. In an ultrasonic temperature measuring arrangement, the combination comprising:
   A. a first acoustic wave propagating element having a first end, a second end, and an internal cylindrical surface extending between said ends for propagating a torsional acoustic interior surface wave, the wall thickness of said first element being greater than the depth of penetration of said surface waves to permit external mechanical contact without significant affect upon the propagation of said interior waves;
   B. an electromechanical transducer mechanically coupled to the first end of said first element and having a pair of electrical terminals, said transducer when electrically energized, launching torsional acoustic interior surface waves on said interior surface toward said second end and when electrically unenergized, electrically responding to torsional acoustic interior surface waves propagating on said interior surface and impinging on said first end;

C. a second acoustic wave propagating element of an elongated, cylindrical configuration of low loss, resonant in a half wavelength, torsional mode at a frequency which is dependent upon temperature, and subject to the thermal conditions under measurment; and D. coupling means comprising a cup-shaped member with a cylindrical wall and a flat base, said member being of lesser outer diameter than but comparable inner diameter to said first element for coupling to interior surface waves propagating to or from said internal cylindrical surface and of greater diameter than said second element for loose coupling, with the cylindrical wall extending a quarter wavelength at said frequency for loose coupling, the edges of said wall of said coupling means being joined to the second end of said first element, and the base of said coupling means being joined to said second element, said coupling means providng low loss and loose coupling for significant energy retention by said resonant element for a substantial number of waves after the dicontinuance of supplied energy.

6. In an ultrasonic temperature measuring arrangement, the combination comprising:

A. a first acoustic wave propagating element having a first end, a second end, and an internal cylindrical surface extending between said ends for propagating torsional acoustic interior surface waves, the wall thickness of said first element being greater than the depth of penetration of said surface waves to permit external mechanical contact without significant affect upon the propagation of said interior waves;

B. an electromechanical transducer mechanically coupled to the first end of said first element and having a pair of electrical terminals, said transducer when electrically energized, launching torsional acoustic interior surface waves on said interior surface toward said second end and when electrically unenergized, electrically responding to torsional acoustic interior surface waves propagating on said interior surface and impinging on said first end;

C. A second acoustic wave propagating element of an elongated, cylindrical configuration of low loss and of lesser outer diameter than the inner diameter of said first element, resonant in a half wavelength, torsional mode at a frequency with a node midway between the ends thereof, said resonant frequency being dependent upon temperature, and subject to the thermal conditions under measurement; and D. coupling means comprising a wafer-shaped member, said member having a greater outer diameter than the inner diameter of said first element for coupling to interior surface waves propagating to or from said internal cylindrical surface and of greater diameter than said second element for forming an encircling attachment to said second element at a position near the node of said second element, said coupling means providing low loss and loose coupling for significant energy retention by said resonant element for a substantial number of waves after the discontinuance of supplied energy.

7. The combination set forth in claim 6, having in addition thereto,

E. variable frequency excitation means coupled to the terminals of said electromechanical transducer to supply continuous waves in pulses of a given duration, said pulse duration being long enough for the energy storage in said resonant element to stabilize, maximum energy storage occurring when the frequency of said continuous waves is adjusted to said resonant frequency;

F. means coupled to the terminals of said electromechanical transducer for response to a quantity indicative of the energy stored in said second element for adjusting the frequency of said excitation means is adjusted to said resonant frequency; and G. means responsive to the frequency of said excitation means to indicate the temperature.

* * * * *